United States Patent [19]
Duhayer et al.

[11] Patent Number: 6,146,450
[45] Date of Patent: Nov. 14, 2000

[54] INSTALLATION FOR SEPARATING A GASEOUS MIXTURE

[75] Inventors: Alain Duhayer, La Varenne Saint Hilaire; Yves Engler, Vincennes; Christophe Soulabail, Noisy le Grand, all of France

[73] Assignee: L'Air Liquide, Societe Anonyme pour l'Etude et l'Exploitation des Procedes Georges Claude, Paris, France

[21] Appl. No.: 09/176,153

[22] Filed: Oct. 21, 1998

[30] Foreign Application Priority Data

Oct. 21, 1997 [FR] France .................................. 97 13189

[51] Int. Cl.[7] ................................................. B01D 53/047
[52] U.S. Cl. .................................................. 96/130; 95/96
[58] Field of Search ....................... 95/96–98, 100–105; 96/130

[56] References Cited

U.S. PATENT DOCUMENTS

| | | | |
|---|---|---|---|
| 2,722,999 | 11/1955 | Bratzler et al. | 96/130 X |
| 3,430,418 | 3/1969 | Wagner | 95/100 |
| 3,564,816 | 2/1971 | Batta | 95/100 |
| 3,636,679 | 1/1972 | Batta | 95/100 |
| 3,703,068 | 11/1972 | Wagner | 96/130 X |
| 3,775,946 | 12/1973 | Brazzel | 96/130 X |
| 3,891,411 | 6/1975 | Meyer | 96/130 X |
| 4,026,680 | 5/1977 | Collins | 55/26 |
| 4,077,780 | 3/1978 | Doshi | 95/100 |
| 4,168,149 | 9/1979 | Armond et al. | 96/130 X |
| 4,194,890 | 3/1980 | McCombs et al. | 96/130 X |
| 4,315,759 | 2/1982 | Benkmann | 96/130 X |
| 4,360,362 | 11/1982 | Asztalos | 96/130 X |
| 4,371,380 | 2/1983 | Benkmann | 95/100 X |
| 4,512,779 | 4/1985 | Haÿ | 96/130 X |
| 4,737,167 | 4/1988 | Ohtani et al. | 95/102 |
| 4,761,165 | 8/1988 | Stöcker et al. | 96/130 X |
| 4,802,899 | 2/1989 | Vrana et al. | 55/161 |
| 5,096,470 | 3/1992 | Krishnamurthy | 95/102 |
| 5,112,590 | 5/1992 | Krishnamurthy et al. | 96/130 X |
| 5,122,164 | 6/1992 | Hirooka et al. | 96/130 X |
| 5,425,240 | 6/1995 | Jain et al. | 96/130 X |

FOREIGN PATENT DOCUMENTS 37 18 880  6/1988  Germany.

*Primary Examiner*—Robert H. Spitzer
*Attorney, Agent, or Firm*—Young & Thompson

[57] ABSTRACT

An installation for the separation of a gaseous mixture, particularly for the production of hydrogen, by pressure modulated adsorption, comprises at least one pair of adsorbers (I, II; III, IV) operating offset as to time according to a predetermined cycle comprising phases of adsorption, regeneration and pressure increase. Each adsorber is connected by an associated distribution conduit (6) and valved branch conduits (7) leading from one end to this distribution conduit (6), to at least three conduits (1, 2, 3, 4, 5) common to the assembly of the adsorbers (I, II; III, IV). The valved branch conduits (7) of the pair of adsorbers, adapted to ensure their connection to each common conduit (1, 2, 3, 4, 5), are connected to each other at their opposite ends to the distribution conduits (6), by a T connection (20) and are connected by this T connection (20) and a common straight tube, to the common conduit (1, 2, 3, 4, 5).

3 Claims, 2 Drawing Sheets

INSTALLATION FOR SEPARATING A GASEOUS MIXTURE

CROSS REFERENCE TO RELATED APPLICATION

This application corresponds to French application 97 13189 of Oct. 21, 1997, the disclosure of which is incorporated herein by reference.

FIELD OF THE INVENTION

The invention relates to an installation for the separation of a gaseous mixture, particularly for the production of hydrogen, by pressure modulated adsorption (Pressure Swing Adsorption or PSA), comprising several adsorbers. Such an installation will be hereinafter called a "PSA installation".

BACKGROUND OF THE INVENTION

To better understand the problem solved by the present invention, there is shown in FIG. 1 a known PSA installation according to the state of the art.

The PSA installation shown in FIG. 1 comprises at least two pairs of adsorbers I, II, III, and IV which operate by being offset in time from each other according to a predetermined cycle comprising phases of adsorption, regeneration and pressure increase. Such a cycle generally comprises the steps of balancing pressures between two adsorbers during phases of regeneration and pressure increase.

PSA installations moreover comprise various conduits common to all the adsorbers I, II, III, and IV, namely a supply conduit 1, a production conduit 2, a pressure balancing conduit 3 between two adsorbers, an elution conduit 4, and a conduit 5 for evacuation of the residual gases.

Each adsorber I, II, III, IV is connected at its inlet and at its outlet to a respective associated distributor conduit 6. The terms "inlet" and "outlet" designate the inlet and outlet ends of an adsorber in the adsorption phase.

Individual connecting conduits 7 with valves ensure connection between the distributing conduits 6 associated with the different adsorbers I to IV and the common conduits 1 to 5.

At the level of the distribution conduits 6 and the common conduits 1 to 5, the connections of the connecting conduits 7 are carried out either by means of T connectors 8 whose coaxial fittings are disposed in the distributing conduits 6 or in the common conduits 1 to 5 and whose handles perpendicular to the fittings are welded to the tubes forming the connecting conduits 7 with valves, either by means of elbows 9 when it is a matter of connecting a connecting conduit 7 to one end of a distributing conduit 6 or of a common conduit 1, 2, 3, 4 or 5.

Moreover, each connecting conduit 7 is formed by two sections 10 and 11 of straight tubes, interconnected by an elbow 12, one first section 10 comprising a valve 13 and extending perpendicular to the associated distribution conduit 6 and a second section 11 extending parallel to this conduit 6.

Such an installation has several drawbacks connected to the arrangement of connection of the adsorbers I to IV to the common conduits 1 to 5. Thus, this known arrangement of connections is complicated, such that the valves 13 are not always easy of access to carry out the maintenance operations. Moreover, this arrangement of connections requires a large number of T-shaped connectors and of elbows. Thus, in the installation shown in FIG. 1, there can be counted 24 T connections and 35 elbows.

To assemble the various conduits and valves disposed in the latter, by means of a support frame, such that they form an S structure commonly known as a "valve skid", (indicated in FIG. 1 by broken lines), these numerous T connections and elbows require the provision of a high number of welds, which increases also the cost of production of such an installation.

SUMMARY OF THE INVENTION

The invention seeks to overcome these various drawbacks by providing an installation adapted to operate according to the same cycles of the PSA installations known to the art and in which the connection of the adsorbers to the common conduits of the installation will be simplified and the number of welds reduced.

To this end, the invention has for its object an installation for the separation of a gaseous mixture, particularly for the production of hydrogen, by pressure modulated adsorption, comprising at least one pair of adsorbers operating offset as to time according to a predetermined cycle comprising phases of adsorption, regeneration and pressure increase, each adsorber being connected, by means of an associated distribution conduit and valved branch conduits extending from one end of this distribution conduit, to at least three conduits common to the assembly of the adsorbers, characterized in that the valve connecting conduits of the pair of adsorbers, adapted to ensure their connection to each common conduit, are connected to each other, at their opposite ends to distribution conduits, by means of a T connection, and are connected by means of this T connection and a common straight tube to said common conduit.

BRIEF DESCRIPTION OF THE DRAWINGS

Other characteristics and advantages of the invention will become apparent from the following description, given by way of example, but not limiting in nature, with respect to the accompanying drawings, in which.

DETAILED DESCRIPTION OF THE INVENTION

Figure 2:
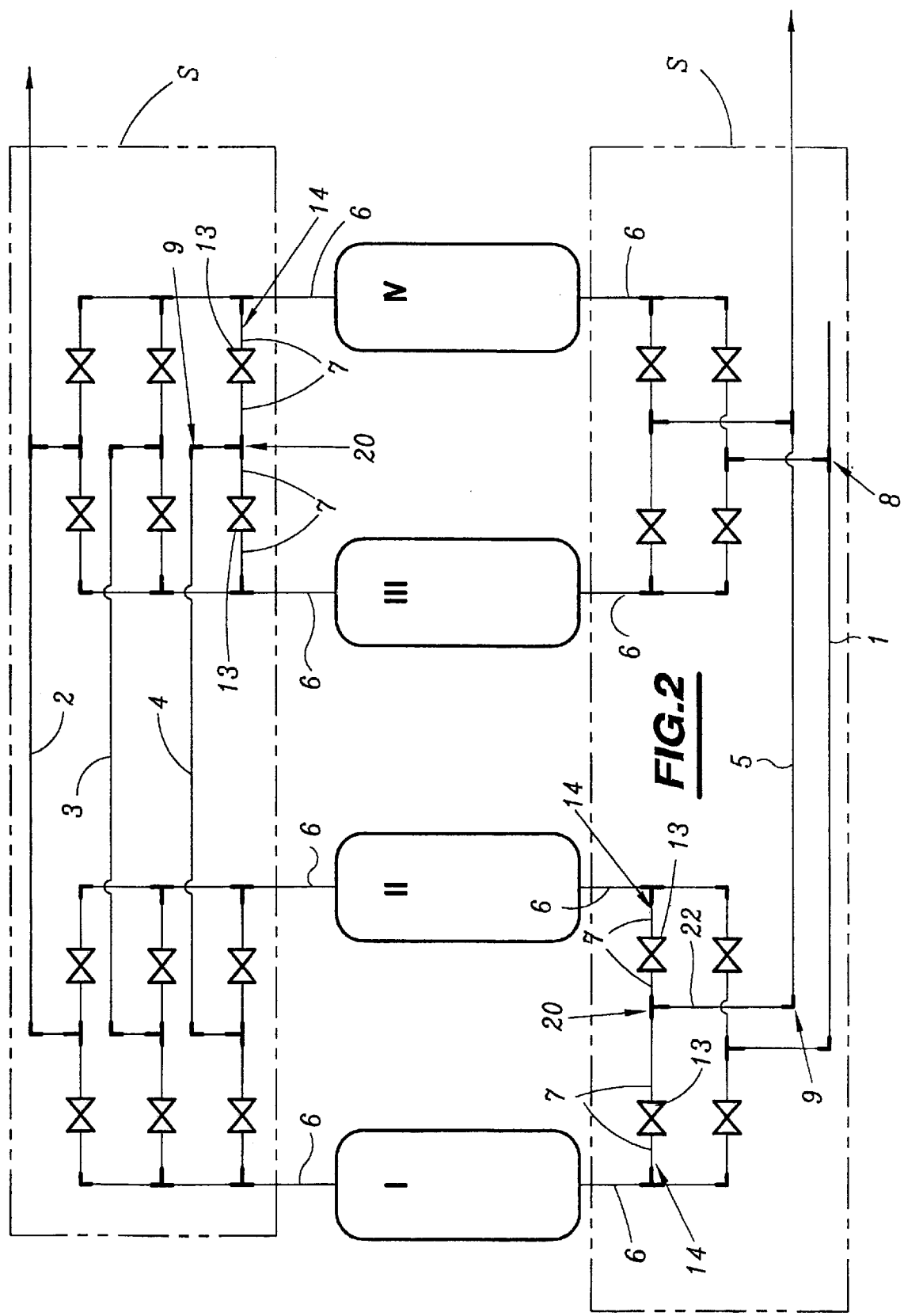
FIG. 2 shows schematically an installation according to the invention.

In FIG. 2 is shown an installation according to the invention.

Figure 1:
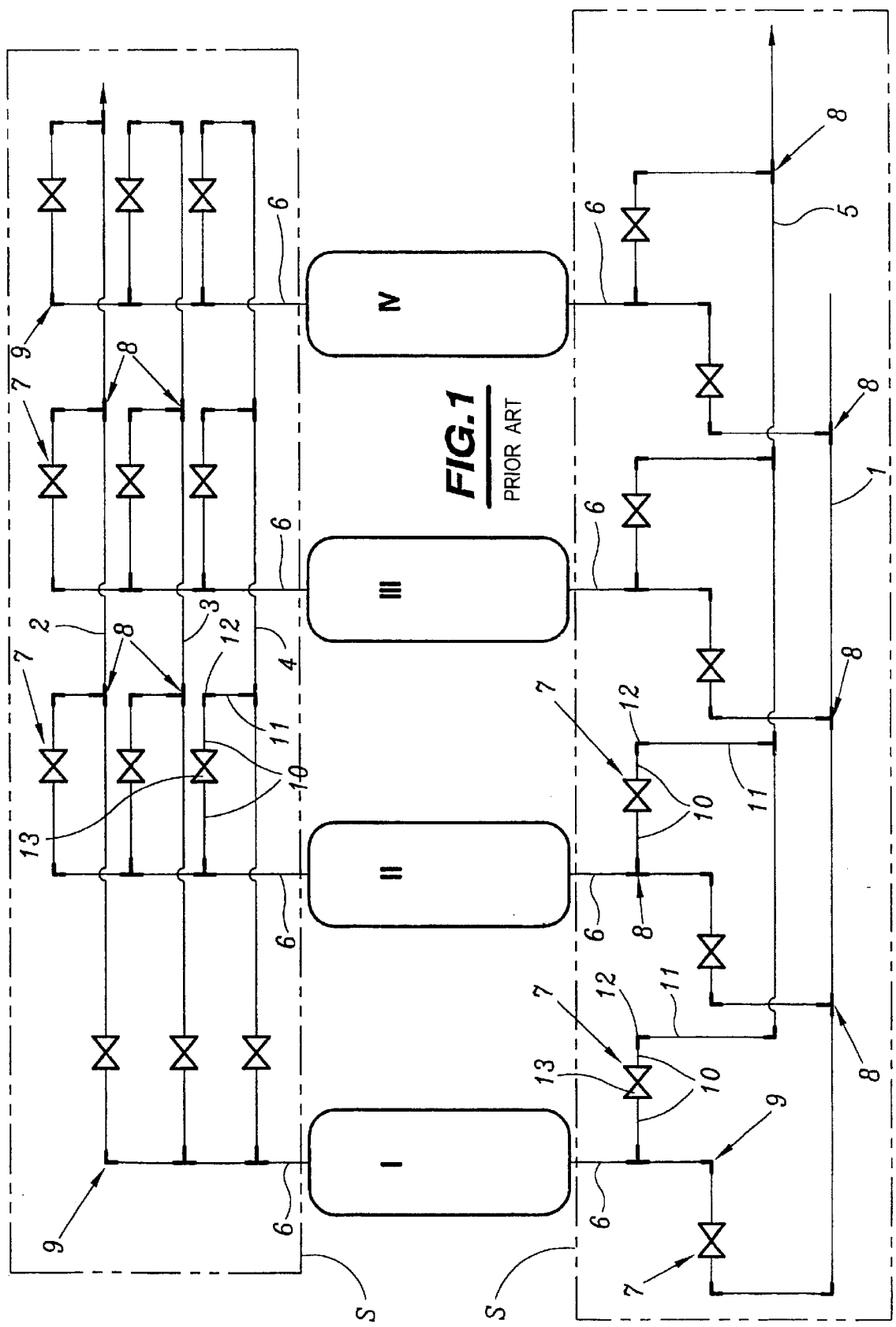
FIG. 1 shows schematically an installation according to the state of the art.

In this figure, elements identical to those of FIG. 1 have the same reference numerals.

The invention shown by way of illustration in FIG. 2 is distinguished from that of FIG. 1 by the following points:

The valve connecting conduits 7 of two adjacent adsorbers, for example adsorbers I and II, which are adapted to be connected to the same common conduit such as the residual gas evacuation conduit 5, are made of straight tubes 14, in which are disposed the valves 13. The connecting conduits are interconnected by their opposite ends to distribution conduits 6 associated respectively with the adsorber I and the adsorber II, by means of coaxial fittings of a T connector 20. The handle of the T connector 20 is connected to the common conduit 5 by means of a conduit 22 associated with these two connected connecting conduits 7 and also formed by a straight tube.

In FIG. 2, this connection arrangement is carried out for adjacent adsorbers I and III as well as II and IV.

In the PSA installation of FIG. 2, the number of T connections 8 and 20 is the same as in the installation of FIG. 1, but there are only 15 elbows 9, which represents a substantial saving of 20 elbows and 40 welds. This permits on the one hand decreasing the cost of production of a PSA installation and on the other hand obtaining easier access to the regulation valves 13, such that maintenance of such a PSA installation will be substantially simplified.

As a modification, the system of connection of the connecting conduits 7 can be arranged crosswise. Thus, for example, for the supply conduit 1, as well as III and IV, and for the supply conduit 5, there are connected by means of T connections 20 the branch conduits 7 corresponding to the adsorbers II and III on the one hand, and I and IV on the other hand.

Also as a modification, only certain couples of adsorbers can be paired relative to a given common conduit 1, and there are connected by means of T connectors 20 the branch conduits 7 of the adsorbers I and II, whilst the adsorbers III and IV are connected individually, in conventional manner, to the conduit 1.

Of course, the invention is applicable equally to installations comprising a number of adsorbers different from four.

What is claimed is:

1. Apparatus for the separation of a gaseous mixture by pressure modulated adsorption, comprising at least two pairs of adsorbers operating in phase shift according to a predetermined cycle comprising phases of adsorption, regeneration and pressure increase, each adsorber having a first end and an opposite second end, the first ends of each pair connected to at least two first common distribution conduits, the second ends of each pair connected to at least two second common distribution conduits, the connection of each said end to an associated said common distribution conduit achieved serially by a valved conduit portion, a T connector and an intermediate straight tube; a said T connector and an associated intermediate straight tube being common to each pair of adsorbers.

2. The apparatus of claim 1, wherein each of said valved conduit portions comprises a straight tube portion including a valve and connected to the associated T connector.

3. The apparatus of claim 1, wherein each first end is connected to two common distribution conduits including a feed conduit, and each second end is connected to three common distribution conduits including a production conduit.

* * * * *